Feb. 2, 1954    R. D. HULL    2,668,025
FISHING REEL
Filed Jan. 17, 1952    2 Sheets-Sheet 1
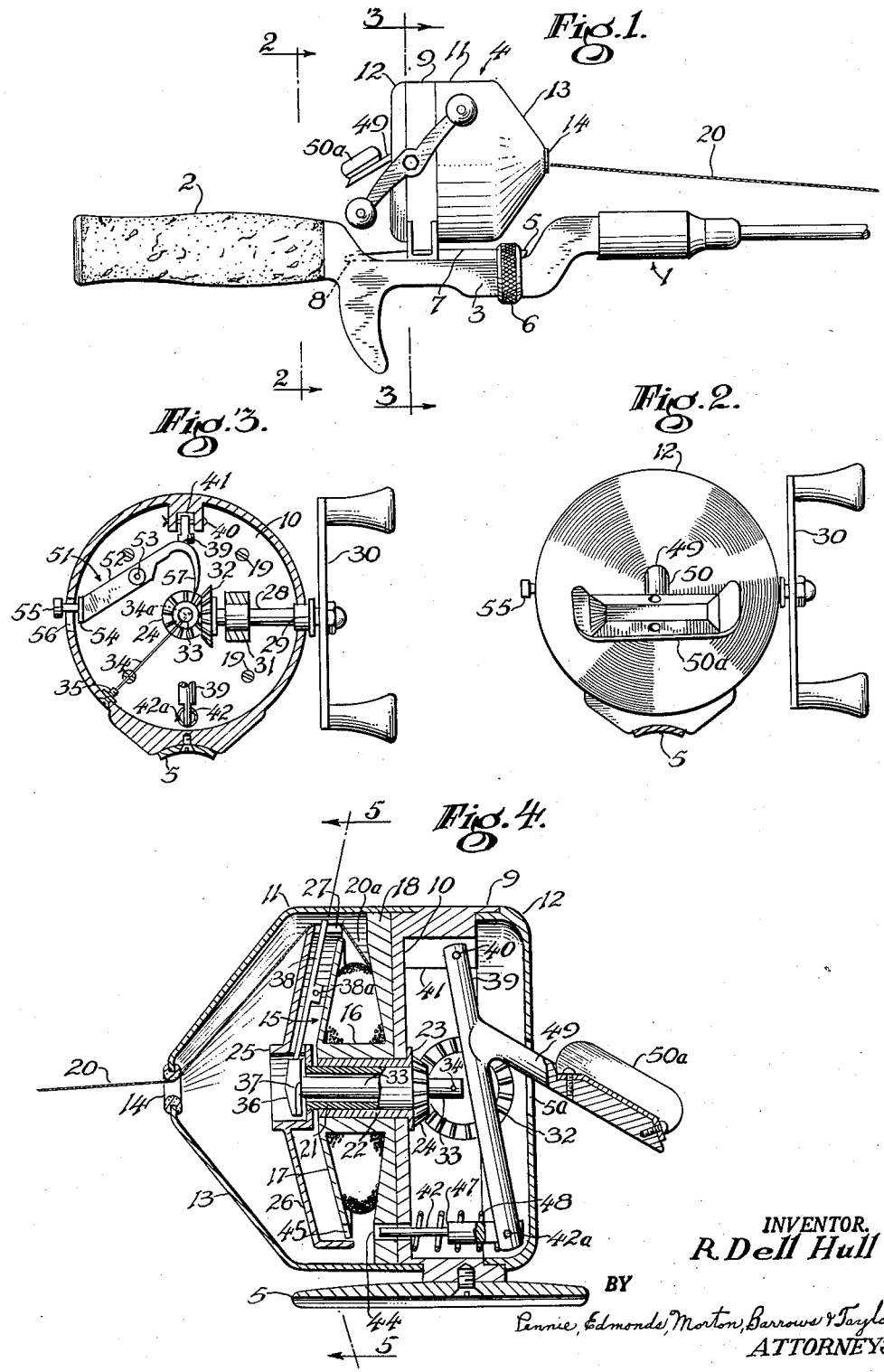
INVENTOR.
R. Dell Hull
BY
Pennie, Edmonds, Morton, Barrows & Taylor.
ATTORNEYS Feb. 2, 1954 R. D. HULL 2,668,025
FISHING REEL
Filed Jan. 17, 1952 2 Sheets-Sheet 2
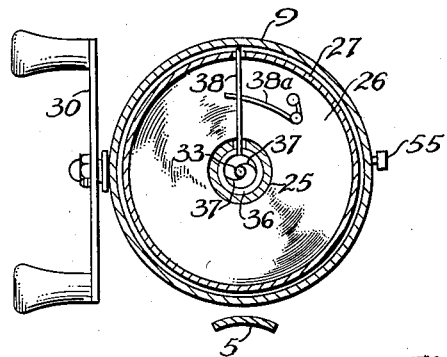
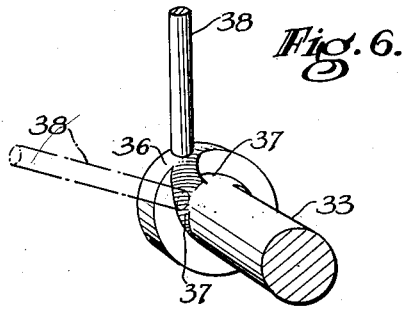
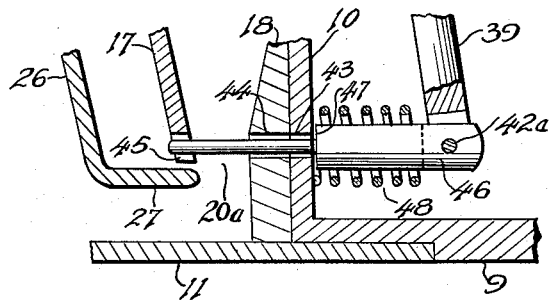
INVENTOR.
R. Dell Hull
BY
Pennie, Edmonds, Morton, Barrows & Taylor.
ATTORNEYS Patented Feb. 2, 1954

2,668,025

UNITED STATES PATENT OFFICE 2,668,025

FISHING REEL

R. Dell Hull, Tulsa, Okla.

Application January 17, 1952, Serial No. 266,916

7 Claims. (Cl. 242—84.5)

This invention relates to fishing reels and more particularly to casting reels of the so-called "spinning" type.

In such devices, the spool on which the line is wound remains stationary at all times. In casting, the line feeds off of the spool by a rotary or "spinning" movement about the periphery of the forward spool flange under the pull of the lure attached to the end of the line. Rewinding or retrieving of the line is ordinarily accomplished by means of a rotatable finger or pickup member which guides the line back on the spool.

Improved casting reels of this type are disclosed in my co-pending applications Serial No. 219,345, filed April 5, 1951, and Serial No. 266,915, filed January 17, 1952. The present invention is directed to further improvements in the construction of reels of this type, and particularly to further improvements in the brake mechanisms employed in controlling the line during casting and to the brake actuating mechanism by which these mechanisms and the reel as a whole is made more efficient, is substantially simplified in construction and operation and is substantially reduced in cost of manufacture.

Other and more specific objects and advantages of this invention will become apparent from the following detailed description when read in conjunction with the accompanying drawings which illustrate a useful embodiment in accordance with the present invention.

In the drawings:

Fig. 1 is an elevational view of the reel in position on a fishing rod;

Fig. 2 is an elevational view looking toward the back of the reel from line 2—2 of Fig. 1;

Fig. 3 is a transverse, vertical, cross-sectional view on line 3—3 of Fig. 1;

Fig. 4 is a longitudinal, sectional view on line 4—4 of Fig. 3, showing the parts in the positions occupied during re-winding;

Fig. 5 is a transverse, cross-sectional view on line 5—5 of Fig. 4;

Fig. 6 is a perspective view of a detail of the reel structure;

Fig. 7 is a view similar to Fig. 4 showing the parts in the positions occupied while brakng the lne; and Fig. 8 is an enlarged view showing the principal details of the braking mechanism.

Referring to the drawings, the reference numeral 1 designates generally a fishing rod of any desired and generally conventional construction. This rod is provided with a handle portion 2 and is further provided with the usual off-set reel-receiving portion 3 which is flattened at its upper side. The reel, designated generally by the numeral 4, is mounted on a supporting plate 5 adapted to be secured to the flattened surface of the reel-receiving portion of the handle, as shown. A securing ring 6 is arranged on the reel-receiving portion of the rod and is adapted to slide over one end of plate 5, which is upwardly tapered, as at 7, to wedgingly clamp the plate to the reel-receiving portion. In the construction shown, where the reel-receiving portion of the rod merges with the handle portion, there is provided a slot 8 for the reception of the opposite end of supporting plate 5.

Reel 4 comprises a tubular casing 9 formed of any suitable material and having a wall 10 adjacent its forward end. Casing 9 is provided with a front cover 11 and a rear cover 12, both of which are adapted to fit snugly over the respective forward and rear ends of casing 9 and to be removable when desired. The forward portion of cover 11 is formed with a forwardly tapering conical portion 13 provided at its apex with a line guide opening 14.

A line spool, designated generally by the numeral 15, is composed of a tubular hub 16 and front and rear circular flanges 17 and 18, respectively, mounted on the opposite ends of hub 16. Line spool 15 is positioned in the casing forwardly of wall 10 and is rigidly affixed thereto in any suitable manner, as by means of screws 19 (Fig. 3) which connect rear flange 18 to wall 10. It will be understood that flange 18 may be made an integral part of wall 10. The line 20 will be wound on hub 16 and confined between flanges 17 and 18. Flanges 17 and 18, or the inner faces thereof, are formed or shaped to incline inwardly toward each other, as illustrated, to form a relatively narrow throat 20a at the outer periphery of the spool and which will be positioned substantially about the center of the spool. This spool design, that is, one employing inwardly inclined or sloping flanges is described in detail in my above-mentioned co-pendng application Serial No. 266,915, wherein it is disclosed that the inwardly sloping flanges greatly improve the casting characteristics of reels of the general type herein described.

A tubular shaft 21 extends axially through the bore of hub 16 and is journalled in an anti-friction bearing 22 interposed between shaft 21 and hub 16. The inner (rearward) end of bearing 22 may be provided with an annular flange 23 which bears against the rearward face of wall 19. The rearward end of shaft 21 carries an axially bored pinion 24 which is fixedly mounted on the shaft and bears against the outer face of bearing flange 23. The forward end of shaft 21 extends forwardly beyond the forward end of spool 15 and is threadedly connected to an enlarged tubular hub 25 of a rearwardly tapering, generally conical disk 26 which is spaced slightly forwardly from flange 17 to provide a sufficient degree of clearance therefrom to permit disk 26 to rotate freely relative to spool 15. The outer periphery of disk 26 carries a rearwardly turned lip 27, the free end of which extends over and closely adjacent the outer periphery of spool flange 17. The outer surface of lip 27 and its edges are preferably rounded and polished to provide a smooth surface for engagement by line 20 in its movement to and from the spool.

A crankshaft 28 is mounted in casing 9 on the rear side of wall 10 at right angles to the axis of tubular shaft 21 and projects radially through the side of casing 9 through a bearing 29, and has mounted on its outer end a crank 30. The inner portion of crank shaft 28 is journalled in a support bearing 31 which is attached to the rear face of wall 10. Crank shaft 28 carries on its inner end a pinion 32 which is continuously in mesh with pinion 24, whereby rotation of crank 28 will rotate shaft 21 and disk 26.

A cylindrical rod 33 extends slidably through the bore of tubular shaft 21 and through the bore of pinion 24 and projects rearwardly therefrom. Spring means, such as a detent 34 (Fig. 3), has its free end inserted through an opening extending transversely through rod 33 adjacent its rearward end and has its other end anchored to the side of casing 9, as by means of a bolt 35, whereby the detent will normally resiliently urge rod 33 in the rearward direction, while at the same time preventing rotation of the rod. The forward end of rod 33 extends into hub 25 and has formed thereon a circular head 36 on the inner face of which are formed one or more generally radially sloping cams 37 leading from the cylindrical surface of rod 33 to the periphery of head 36 (Fig. 6), the ends of the cams being suitably faired respectively into the surface of rod 33 and the periphery of head 36. A pin 38 is mounted for radial sliding movement on the inner face of disk 26 (Figs. 4, 5 and 7), the inner end of the pin extending through a suitable radial opening in the wall of hub 25, and the outer end of the pin extending through a suitable opening in lip 27. A spring arm 38a has one end attached to the inner face of disk 26 and its other end connected to pin 38 and arranged to normally resiliently urge pin 38 inwardly toward rod 33. With the cam and pin arrangement described, it will be seen that when rod 33 is moved forwardly relative to disk 26, head 36 will move in front of the inner end of pin 38 which, under the urging of spring arm 38a will drop behind head 36 and rest on the surface of rod 33, thereby retracting the outer end of pin 38 inside the outer periphery of lip 27, as illustrated particularly in Fig. 7. When disk 26 is rotated pin 38 will ride up on cams 37 and on to the periphery of head 36, allowing rod 33 to retract under the urging of detent 34. At this stage the outer end of pin 38 will be projected beyond the periphery of lip 27. Once pin 38 is resting on the periphery of head 36 and the latter is fully retracted, the pin will remain in this position irrespective of the direction of rotation of disk 26, until rod 33 is again moved to its forward position.

Forward movement of rod 33 is effected by means of an actuating bar 39 which is positioned diametrically of the rear portion of casing 9 and extends across, and in registration with the inner end of rod 33. One end of bar 39 is pivotally connected by means of a pivot pin 40 to a bracket 41 mounted on the wall of casing 9. The opposite end of bar 39 (as best seen in Fig. 8) is pivotally connected by means of a pivot pin 42a to a plunger 42 disposed parallel to the longitudinal axis of casing 9 and having its forward end slidably extending into registering openings 43 and 44 in wall 10 and the outer end of flange 18, respectively. Flange 17 is provided in its outer periphery with a notch 45 registering with openings 43 and 44 and adapted to receive the forward end of plunger 42 when the latter is urged forwardly through openings 43 and 44. The rearward end of plunger 42 is provided with a shank 46 of somewhat enlarged diameter forming a shoulder 47 which is adapted to engage the rear face of wall 10 about opening 43 to thereby limit the forward movement of plunger 42 to a distance such that its forward end may enter notch 45 without projecting more than a very slight amount into the space between flange 17 and disk 26. A coil spring 48 surrounds shank 46 and is mounted in compression between the rear face of wall 10 and bar 39 so as to normally urge plunger 42 rearwardly out of engagement in opening 45, as seen in Fig. 4. Rear cover 12 serves to limit the rearward movement of plunger 42. An actuating arm 49 has one end rigidly fastened to bar 39 and extends rearwardly therefrom at an angle so that its other end will project through an elongated slot 50 in rear cover 12 to the exterior thereof. A thumbing plate 50a is removably mounted on the outer end of arm 49 to receive the thumb of the caster. With this arrangement, it will be seen that forward movement of rod 33 and of brake plunger 42 are both effected by application of downward pressure of the caster's thumb on thumbing plate 50a, for the purpose of controlling operation of the reel in a manner to be described more fully hereinafter.

The reel may also be provided with a click mechanism of any suitable construction. In the particular form illustrated (Fig. 3), the click mechanism is formed of a single piece 51 of flat spring steel. The intermediate portion 52 is arranged to lie flat against the rear face of wall 10 and is pivoted thereon by means of a pivot pin 53. The outer end portion 54 is bent at right angles to the intermediate portion to be parallel to the wall of casing 9 and is provided with a thumb button 55 extending through an elongated opening 56 to the exterior of the casing. The opposite end 57 of the strip is narrowed and twisted at right angles to the plane of the intermediate portion forming a flexible finger which extends toward the teeth of pinion 24. The click device is shown in Fig. 3 in the operative position. By moving button 55 downwardly, the device is swung on pivot 53 to bring finger 57 out of engagement with the teeth of pinion 24.

The above-described reel operates in the following manner: It will be assumed that a rewinding operation has just been completed. At this stage the parts of the reel will be in the positions shown in Fig. 4, in which it will be noted that the inner end of pin 38 is riding on the periphery of head 36 and its outer end is projecting through lip 27 into engagement with line 20, and that rod 33, brake plunger 42 and bar 39 are in their rearwardly retracted positions under the urging of coil spring 48 and detent 34.

To prepare the reel for casting, the operator presses his thumb forwardly and downwardly on thumbing plate 50a (Fig. 7), pushing arm 49 and bar 39 forwardly. The latter will thereby pivot about pivot pin 40 and thrust against the end of rod 33 urging the latter forwardly, while its lower end will, at the same time, urge plunger 42 forwardly. As rod 33 moves forwardly, head 36 will move in front of pin 38, allowing the inner end of pin 38 to drop behind head 36 thereby retracting its outer end inside lip 27 and releasing line 20. Rod 33 will also thereby be locked against retraction. At the same time, the forward pressure applied to plunger 42 will move the free end of the latter across throat 20a into notch 45 thus forming a block across the spool which will catch the line and prevent it from feeding off the spool until a cast is made. These positions are shown in Fig. 7 and the reel will be ready to start a cast.

As the cast is begun, the thumb pressure of the operator will be relieved from thumbing plate 50a, thereby relieving the forward pressure on bar 39, allowing plunger 42 to retract to the position shown in Fig. 4 under the urging of coil spring 48. This will release line 20 which will unwind from spool 15 and will be drawn forwardly over lip 27 in response to the pull of the lure attached to line 20. Disk 26 will remain stationary while the line is feeding out. Pin 38 will remain in the retracted position during the cast, since its inner end is still behind head 36, and the length of the cast and the movement of the line from the spool may be controlled by pressure applied to thumbing plate 50a which will be employed to thrust plunger 42 across the path of the unwinding line, the latter being stopped completely when plunger 42 has been urged forwardly entirely across throat 20a. Before the latter stage is reached and as the end of plunger 42 moves toward flange 17, throat 20a will be progressively narrowed reducing the gap for escape of line 20 and producing a degree of friction of the line on the forward end of plunger 42, which will preferably be rounded or tapered to allow the line to slip or slide over the end of the plunger before it completely closes throat 20a. It will be seen that the thumbing movements employed in controlling the cast will be closely similar in all respects to the movements employed in controlling the cast from more conventional reels.

When it is desired to retrieve and re-wind the line, bar 39 will be allowed to return to its normally retracted position by removing all thumb pressure on arm 49 and the operator simply begins turning crank 30 to rotate shaft 28 and pinion 32 in the re-winding direction. The engagement of the latter with pinion 24, which is fixed to tubular shaft 21, will rotate shaft 21 and disk 26. Rotation of disk 26 will be transmitted to pin 38 which will rotate with disk 26 until the inner end of the pin registers with the inner end of one of the cams 37. As soon as this occurs rod 33 begins to retract under the urging of detent 34 and, as rotation of disk 26 continues, the inner end of pin 38 will ride up over cam 37 on to the periphery of head 36, contemporaneously with the continued retraction of rod 33. As the inner end of pin 38 comes up on the cam and on to the periphery of head 36, the outer end of pin 38 will be projected beyond lip 27 and will engage line 20. It will be understood that all of these movements will occur during a fractional part of the first rotation of crank 30, depending upon the initial arcuate distance between the inner end of pin 38 and the inner end of cam 37. By employing more than one cam 37, the degree of rotation required for the pick-up movements of pin 38 to take place may be reduced proportionally. Thereafter, continued rotation of the crank will rotate disk 26 and the projecting pin 38 and the latter will catch line 20 and re-wind it on spool 15 as the disk rotates, until the line has been retrieved to the desired degree, at which instant the parts of the reel will again be in the positions illustrated in Fig. 4 and ready to begin another series of casting operations as previously described.

Reels constructed as above-described are very efficient and simple to operate and may be constructed at much lesser cost than more conventional reels. While I have shown and described a preferred form of the invention, it is, of course, understood that modifications therein, within the scope of the appended claims, may be made without departing from the spirit of the invention.

I claim:

1. A spinning type reel comprising a tubular casing, a line-carrying spool non-rotatably mounted in the casing, a line pick-up member rotatably mounted in front of the spool, a plunger mounted in the casing and movable in a direction parallel to the axis of the spool to connect a portion of circumferentially restricted area on the front flange with the rear flange of the spool thereby to brake a line in passage from the spool, means for moving said plunger to its braking position, and means for rotating said line pick-up member.

2. A spinning type reel comprising a tubular casing, a line-carrying spool non-rotatably mounted in the casing, a line pick-up member rotatably mounted in front of the spool, said spool having front and rear flanges extending transversely of the casing, a brake plunger journalled in a bore through the rear flange of the spool and movable in a direction parallel to the axis of the spool to a position of circumferentially restricted area of engagement with a peripheral portion of the front flange to thereby brake a line in passage over the front flange of the spool, and means for moving said plunger to said braking position.

3. A spinning type reel according to claim 2 in which a notch is formed in the periphery of the front flange of the spool into which the forward end of the plunger passes when the plunger is moved to braking position.

4. A spinning type reel according to claim 3 in which means is provided to limit the forward movement of the plunger.

5. A spinning type reel comprising a tubular casing, a line-carrying spool non-rotatably mounted in the casing, a line pick-up member rotatably mounted in front of the spool, a brake member mounted in the casing substantially rearwardly of the spool and movable relative to the spool in a direction parallel to the axis thereof to engage a peripheral portion of the front flange of the spool to brake a line in passage over the front flange of the spool, a bar within the casing pivotally secured at one end to a portion of the casing, the other end of said bar being pivotally secured to said brake member, and a thumb member supported on an arm secured to said bar and extending out of the rear end of said casing whereby said bar may be pivoted about its end secured to the casing to move said member into engagement with said front flange of the spool.

6. A spinning type reel according to claim 5 which includes spring means normally maintaining said brake member in its rearward position out of engagement with the front flange of the spool.

7. A spinning type reel according to claim 6 in which a notch is formed in the periphery of the front flange of the spool and receives the forward portion of the brake member when said member is advanced to braking position, and which includes means for limiting the forward movement of said brake member.

R. DELL HULL.

References Cited in the file of this patent

UNITED STATES PATENTS

| Number | Name | Date |
|---|---|---|
| 1,150,575 | Blodgett | Aug. 17, 1915 |
| 2,602,603 | Blissit | July 8, 1952 |

FOREIGN PATENTS

| Number | Country | Date |
|---|---|---|
| 904,699 | France | Mar. 12, 1945 |